United States Patent
Mori et al.

[11] Patent Number: 5,985,387
[45] Date of Patent: Nov. 16, 1999

[54] THERMO-SHRINKABLE POLYESTER FILM

[75] Inventors: Kuniharu Mori, Aichi-ken; Mitsuo Inoue, Osaka; Shinichiro Okumura, Aichi-ken; Tsutomu Oko, Aichi-ken; Norimi Tabota, Aichi-ken; Masatoshi Hashimoto, Aichi-ken; Hideki Ito, Aichi-ken; Seizo Takabayashi, Aichi-ken; Tsutomu Isaka, Osaka, all of Japan

[73] Assignee: Toyo Boseki Kabushiki Kaisha, Osaka-Fu, Japan

[21] Appl. No.: 09/240,024

[22] Filed: Jan. 29, 1999

[30] Foreign Application Priority Data

Jan. 30, 1998 [JP] Japan ............................. 10-018850
Mar. 30, 1998 [JP] Japan ............................. 10-104086

[51] Int. Cl.$^6$ ........................................ B65B 53/00
[52] U.S. Cl. .................... 428/34.9; 528/272; 428/332; 428/339
[58] Field of Search ................. 528/272; 428/34.9, 428/332, 339

[56] References Cited

U.S. PATENT DOCUMENTS

| | | | |
|---|---|---|---|
| 4,963,418 | 10/1990 | Isaka et al. ............................. | 428/34.9 |
| 4,980,223 | 12/1990 | Nakano et al. ........................ | 428/198 |
| 4,996,291 | 2/1991 | Yoshinaka et al. .................... | 528/272 |
| 5,223,315 | 6/1993 | Katsura et al. ....................... | 428/36.92 |
| 5,466,521 | 11/1995 | Sato et al. ............................ | 428/330 |
| 5,472,538 | 12/1995 | Minakuchi et al. ................... | 156/85 |
| 5,514,462 | 5/1996 | Endo et al. ........................... | 428/323 |
| 5,747,174 | 5/1998 | Kimura et al. ....................... | 428/480 |
| 5,851,610 | 12/1998 | Ristey et al. ......................... | 428/34.9 |

Primary Examiner—Samuel A. Acquah
Attorney, Agent, or Firm—Morrison & Foerster LLP

[57] ABSTRACT

In a thermo-shrinkable polyester film, the thermal shrinkage ratio in a main shrinking direction is about 20% or more after being treated in water of about 70° C. for about seconds, about 35 to about 55% after treated in water of about 75° C. for about 5 seconds, and about 50 to about 60% after being treated in water of about 80° C. for about 5 seconds. After the film is shrunk by about 5% by treatment in water of about 75° C. for about 10 seconds, the probability of the elongation at rupture of the film in the direction perpendicular to the main shrinking direction being about 20% or less, is about 10% or less. The ratio of $\tau_1/\tau_2$ is about 0.05 to about 0.45, where $\tau_2$ is the stress of shrinkage in a main shrinking direction of the film at about 90° C., and $\tau_1$ is the stress of shrinkage in a direction perpendicular to the main shrinking direction of the film at about 90° C. The sealing strength of the film is about 1.2 kg/15 mm of width or more.

6 Claims, 1 Drawing Sheet

10mm

THERMO-SHRINKABLE POLYESTER FILM

BACKGROUND OF THE INVENTION

1. Field of the Invention

The present invention generally relates to a thermo-shrinkable polyester film, and specifically, to a thermo-shrinkable polyester film suitable for a labeling film or a covering of a container having a complicated shape such as, for example, cosmetic containers, fragrance or toiletry containers, or liquid medication containers.

2. Description of the Related Art

Conventionally, thermo-shrinkable films used as labels or coverings provided on bottles are mainly formed of poly (vinyl chloride), polystyrene, polyethylene and the like. Recently, thermo-shrinkable polyester films have been a focus due to the following problems with the above-mentioned materials. Poly(vinyl chloride) generates chlorine gas when burned for disposal. Polyethylene is difficult for use in printing characters and graphics on a film formed thereof. Moreover, when these materials are used for labels around polyethylene terephthalate (PET) bottles, the material of the labels needs to be distinguished from the material of the PET bottles in order to recycle the PET bottles.

Conventional thermo-shrinkable polyester films are not satisfactory as labeling films. The films shrink rapidly resulting in wrinkles, non-uniform shrinkage, and distortion. Further, the post-shrinkage films are easily ruptured by an external impact.

In order to solve these problems, Japanese Publication for Opposition No. 7-77757 discloses a method for significantly reducing the elongation at rupture in the direction perpendicular to a main shrinking direction of the film to improve the post-shrinkage state of the film.

Japanese Laid-Open Publication No. 58-64958 discloses a method for reducing the shrinking force of the film to improve the post-shrinkage state of the film.

However, the methods disclosed in these documents do not provide a satisfactory post-shrinkage state of the film when applied to produce labels for small PET bottles. Such bottles' labels are shrunk by passing the bottles through a shrinkage tunnel for a relatively short time.

Furthermore, demand for the recycling of bottles formed from thermoplastic polymers has increased greatly in order to deal with the environmental problems. Especially, the recycling of PET bottles is of great concern, and it is imperative to urgently establish a recycling system therefor. Labels provided around PET bottles generally include, for example, stretched labels formed of polyolefin and the like, thermo-shrinkable labels formed of polyester, polystyrene, vinyl chloride and the like, and tack labels formed of polypropylene and the like. The PET bottles are typically recycled as follows. The bottles are collected from consumers with the labels thereon and eventually brought to recycling companies or plants. The bottles are washed and then treated by primary pulverization to remove the labels. The substance obtained by the pulverization still includes a great amount of the label material. Accordingly, the substance is further treated by secondary pulverization and separation of the label material using specific gravity in liquids, de-watering and drying, separation of the label materials using wind, and pelletization. Thus, recycled pellets are obtained.

Recently, in order to improve the label removal efficiency, the labels are detached from the bottles after the bottles are washed but before pulverization and pelletization.

For performing such a process, labels having perforations are used to facilitate the detachment of the labels. The labels are detached from the bottles by tearing the labels along the perforations.

Films obtained by the methods disclosed in the above-mentioned documents are inferior in the ease of tearing along perforations after thermally shrunk and thus are not satisfactory for a shrinkable label film.

Conventional thermo-shrinkable polyester films which are shrinkable in one direction have further problems in that wrinkles, non-uniform shrinkage and insufficient shrinkage, occur when subjected to shrinkage to cover containers having complicated shapes such as, cosmetic containers, fragrance and toiletry containers, or liquid medication containers.

In order to solve such a problem, Japanese Laid-Open Publication No. 3-29763 discloses a thermo-shrinkable polyester film which is shrinkable in a direction perpendicular to the main shrinking direction. Japanese Laid-Open Publication No. 5-185510 discloses a method for restricting the drawing ratio in both the longitudinal and transverse directions of the film so that the shrinkage ratio in the direction perpendicular to the main shrinking direction is about 15%.

However, films obtained by the methods disclosed in these documents possess very poor sealing strengths (described below in the Evaluation section (9)), the sealing strengths being required for covering the above-mentioned complex-shaped containers.

In order to overcome the problem, Japanese Patent No. 2,566,568 discloses a thermo-shrinkable polyester film having an improved heat seal property.

However, films obtained by the method disclosed in the above-mentioned patent do not possess a satisfactory sealing strength and also have insufficient shrinkage ratios in the direction perpendicular to the main shrinking direction. Such films undesirably tend to cause wrinkles, non-uniform shrinkage and distortion, and thus are not practically usable.

SUMMARY OF THE INVENTION

According to one aspect of the invention, in a thermo-shrinkable polyester film, the thermal shrinkage ratio in a main shrinking direction is about 20% or more after being treated in water of about 70° C. for about 5 seconds, about 35 to about 55% after treated in water of about 75° C. for about 5 seconds, and about 50 to about 60% after being treated in water of about 80° C. for about 5 seconds. After the film is shrunk by about 5% by treatment in water of about 75° C. for about 10 seconds, the probability of the elongation at rupture of the film in the direction perpendicular to the main shrinking direction being about 20% or less, is about 10% or less.

In one example of the invention, the thermo-shrinkable polyester film has a thickness of dispersion of about 6% or less.

In one example of the invention, the thermo-shrinkable polyester film includes a polyester including at least one diol having from about 3 to about 6 carbon atoms, the polyester being adjusted to have a glass transition point of about 58 to about 68° C.

According to one aspect of the invention, in a thermo-shrinkable polyester film, the ratio of $\tau_1/\tau_2$ is about 0.05 to about 0.45, where $\tau_2$ is the stress of shrinkage in a main shrinking direction of the film at about 90° C., and $\tau_1$ is the stress of shrinkage in a direction perpendicular to the main shrinking direction of the film at about 90° C. The sealing strength of the film is about 1.2 kg/15 mm of width or more.

In one example of the invention, the thermal shrinkage ratio in the main shrinking direction after being treated in water of about 95° C. for about 10 seconds is about 40% or more, and the thermal shrinkage ratio in the direction perpendicular to the main shrinking direction after being treated in water of about 95° C. for about 10 seconds is about 15 to about 30%.

In one example of the invention, the thermo-shrinkable polyester film includes a polyester, of which the difference (ΔT) between a melting point (Tm) and a crystallization temperature (Tc$_2$) when a fused polyester is cooled is about 40° C. or less, is contained in an amount from about 10 to 40 wt. % in the thermo-shrinkable polyester film.

Thus, the invention described herein makes possible the advantages of providing: (1) a thermo-shrinkable polyester film which exhibits a satisfactory post-shrinkage state with substantially uniform shrinkage and no wrinkles or distortions in all possible uses, including labels for bottles, and is easily torn along perforations formed therein; and (2) a thermo-shrinkable polyester film which exhibits a satisfactory post-shrinkage state with substantially uniform shrinkage and no wrinkles or distortions even when shrunk in the state of covering a container having a complicated shape such as, for example, cosmetic containers, fragrance and toiletry containers, or liquid medication containers, and has a superior sealing strength.

This and other advantages of the present invention will become apparent to those skilled in the art upon reading and understanding the following detailed description with reference to the accompanying figures.

DESCRIPTION OF THE PREFERRED EMBODIMENTS

Figure 1:
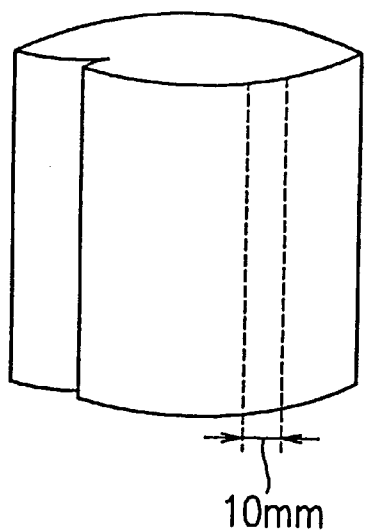
FIG. 1 is a perspective view of a thermo-shrinkable polyester film according to the present invention which is formed into a tube.

Hereinafter, the present invention will be described by way of illustrative examples with reference to the accompanying drawings.
<Embodiment 1>

Polyester used for a thermo-shrinkable polyester film in a first embodiment according to the present invention preferably contains at least one diol having from about 3 to about 6 carbon atoms (e.g., propanediol, butanediol, neopentyldiol, and hexanediol) and is adjusted to have a glass transition point (Tg) of 58 to 68° C.

Preferably, the polyester used in the present invention does not contain diols having about 8 or more carbon atoms (e.g., octanediol), polyhydric alcohols containing 3 or more hydroxyl groups (e.g., trimethylol propane, trimethylol ethane, glycerin, and diglycerin), or polycarboxylic acids (e.g., trimellitic acid, pyromellitic acid and anhydrides thereof). A thermo-shrinkable polyester film obtained using a polyester containing one of these diols, polyhydric alcohols and/or carboxylic acids is not preferable because the elongation at rupture of the post-shrinkage film in the direction perpendicular to the main shrinking direction tends to be undesirably low.

In the case where the polyester used in the present invention contains an aliphatic carboxylic acid (e.g., adipic acid, sebacic acid or decanedicarboxylic acid), such an acid is preferably contained in a content of 3 mol % or less. A thermo-shrinkable polyester film obtained using a polyester containing an aliphatic carboxylic acid at a content of 3 mol % or more is not preferable because the elongation at rupture of the post-shrinkage film in the direction perpendicular to the main shrinking direction tends to be undesirably lowered.

Preferable acids contained in the polyester used in the first embodiment include telephthalic acid, isophthalic acid, and naphthalenedicarboxylic acid. Preferable diols usable in addition to a diol having from about 3 to about 6 carbon atoms include ethylene glycol and 1,4-cyclohexane-dimethanol. It is preferable that diethylene glycol, triethylene glycol and polyethylene glycol are excluded. Especially, since diethylene glycol tends to exist as a by-product at the time of polymerization of polyester, the content of diethylene glycol is preferably restricted to less than 4 mol %.

In the case where two or more types of polyesters are mixed, the amount of acid and diol disclosed in this specification are the contents of the acid and the diol in the entire polyester whether or not ester interchange occurs after the mixture.

In order to especially improve the post-shrinkage state of the inventive film, neopentyl glycol, which is a diol, is preferably used.

In order to improve the smoothness of the film, an inorganic or organic lubricant can be utilized. When necessary, additives such as, for example, a stabilizer, a colorant, an antioxidant, an anti-foaming agent, and an anti-electrostatic charge agent can also be utilized.

In the first embodiment, a polyester as described above is drawn at a temperature of Tg-5° C. or more and less than Tg+15° C.

When the polyester is drawn at a temperature of less than Tg-5° C., the resultant film will not thermally shrink to a sufficient degree and the transparency of the resultant film is spoiled. When the polyester is drawn at a temperature of Tg+15° C. or more, the elongation at rupture of the resultant film in the direction perpendicular to the main shrinking direction tends to be undesirably low.

In the first embodiment, the thermal shrinkage ratio in the main shrinking direction of the polyester film in water is about 20% or more, preferably about 25% or more, after being treated at about 70° C. for about 5 seconds; about 35 to about 55%, preferably about 40 to about 55%, after being treated at about 75° C. for about 5 seconds; and about 50 to about 60%, preferably about 52 to about 58%, after being treated at about 80° C. for about 5 seconds. In the case where the thermal shrinkage ratio is less than about 20% after being treated at about 70° C. for about 5 seconds, less than about 35% after being treated at about 75° C. for about 5 seconds, or less than about 50% after being treated at about 80° C. for about 5 seconds, the end of the film is expanded like a flower leaf and tends to suffer from non-uniform shrinkage and wrinkles after the film is provided around the bottles as labels or the like and passed through the shrinking tunnel.

In the case where the thermal shrinkage ratio is more than about 55% after being treated at about 75° C. for about 5 seconds or more than about 60% after being treated at about 80° C. for about 5 seconds, the upper or lower ends of the film are extended obliquely or shift to a position above the prescribed position after the film is provided around the bottles as labels or the like and passed through the shrinking tunnel.

In the first embodiment, after the polyester film is shrunk by about 5% by treatment in water of about 75° C. for about 10 seconds, the probability of the elongation at rupture of the film in the direction perpendicular to the main shrinking direction being about 20% or less is about 10% or less, preferably about 8% or less. When the probability is more than about 10%, the resultant film provided around the bottle, as a label, is not easily torn along perforations formed therein; i.e., the film is torn in an unintended direction by the portion held in a hand. In order to allow satisfactory perforations to be formed in the film, the film preferably has a dispersion of thickness (average value) of about 6% or less, preferably about 3% or less.

The thickness of the thermo-shrinkable polyester film in the first embodiment is not limited to any numerical values. Preferably, the film is about 10 to about 200 µm thick, and more preferably, the film is about 20 to about 100 µm thick when used for labels.

Hereinafter, a method for producing a thermo-shrinkable polyester film in the first embodiment will be specifically described, but the present invention is not limited to the following method.

A polyester is dried by a dryer such as, for example, a hopper dryer, a paddle dryer or a vacuum dryer and extruded in the form of a film at about 200 to about 300° C. The extrusion can be performed by any conventional method such as, for example, a T-die method or tubular method. After the extrusion, the film is rapidly cooled to obtain an undrawn film. The undrawn film is then drawn. Since the main shrinking direction is preferably the transverse direction in order to achieve the objectives of the present invention, an exemplary method for forming a film in the case where the main shrinking direction is the transverse direction will be described. In the case where the main shrinking direction is in the longitudinal direction, film formation can be performed in a similar manner except that the drawing direction is changed by 90 degrees.

Before the undrawn film is drawn in the transverse direction using a tenter, the undrawn film is preheated. In order to obtain a uniform thickness of the film, it is preferable to preheat the film to a prescribed temperature at such a low wind speed (i.e., speed of hot air) that the heat transfer coefficient is about 0.0013 cal/cm$^2$·sec·° C. or less. Drawing in the transverse direction is performed at a drawing ratio of about 3× or more, preferably about 3.5× or more, at a temperature of less than Tg+15° C.

Then, the film is heat-treated at about 70 to about 100° C., thereby obtaining a thermo-shrinkable polyester film.

In order to restrict internal heat generation in the film which can accompany drawing and thereby reduce the non-uniformity of the temperature of the film in the transverse direction, the heat transfer coefficient during drawing is preferably about 0.0009 cal/cm$^2$ sec ° C., and more preferably about 0.0011 to about 0.0017 cal/cm$^2$·sec·° C.

In the case where the wind speed during the preheating causes the heat transfer coefficient to be more than about 0.0013 cal/cm$^2$·sec·° C.; or the wind speed during drawing causes the heat transfer coefficient to be less than about 0.0009 cal/cm$^2$·sec·° C., then the thickness of the film tends to be non-uniform. Such a film is not preferable because when multiple color printing is desired because the patterns of different colors are not generally aligned.

When three-color printing is performed to evaluate the post-shrinkage state of the film, a film having a thickness dispersion of about 6% or less allows for easy overlapping of patterns of different colors, whereas a film having a thickness dispersion of more than about 6% does not tend to provide such satisfactory results.

The film can be drawn slightly in the longitudinal direction in addition to one-axis drawing in the transverse direction performed using the tenter. Such two-axis drawing can be performed either by sequential drawing or parallel drawing. When necessary, re-drawing can be performed in the longitudinal or transverse direction.

<Embodiment 2>

Polyester used for a thermo-shrinkable polyester film in a second embodiment according to the present invention preferably contains the following type of polyester mixed therein in order to obtain satisfactory sealing strength. The difference between the melting point (Tm) of the polyester and the crystallizing temperature (Tc$_2$) when a fused polymer is cooled (the difference: $\Delta T=Tm-Tc_2$) is about 40° C. or less. Such a polyester is preferably contained in an amount of from about 10 to about 40 wt. %, and more preferably from about 15 to about 30 wt. %. Hereinafter, such a polyester will be referred to as a "polyester having a ΔT of about 40° C. or less", for the sake of explanation.

An example of the above-described polyester having a ΔT of about 40° C. or less includes polybutyleneterephthalate, polybutylenenaphthalate and polyesters obtained by copolymerizing such a polyester with an acid component or an aliphatic long-chain glycol component. In the second embodiment, at least one known dicarboxylic acid is usable as the acid component included in the polyester having a ΔT of about 40° C. or less, for example, terephtalic acid, naphthalene-dicarboxylic acid, oxalic acid, malonic acid, succinic acid, adipic acid, azelaic acid, isophthalic acid, decanedicarboxylic acid, or dimer acid can be used. Furthermore, at least one known diol is usable as the diol component included in the polyester having a ΔT of about 40° C. or less, for example, ethylene glycol, neopentyl glycol, hexamethylene glycol, 1,4-cyclohexanedimethanol, dimer acid diol, or tetramethylene glycol added to ethylene oxide can be used.

In order to further improve the post-shrinkage state of the film, neopentyl glycol, which is a diol, is preferably used.

In order to improve the smoothness of the film, an inorganic or organic lubricant can preferably be used. When necessary, additives such as, for example, a stabilizer, a colorant, an antioxidant, an anti-foaming agent, and an anti-electrostatic charge agent can be used.

In the second embodiment, where ($\tau_2$) is the shrinkage stress of the thermo-shrinkable polyester film in the main shrinking direction when the film is shrunk at about 90° C. and ($\tau_1$) is the shrinkage stress of the film in the direction perpendicular to the main shrinking direction when the film is shrunk at about 90° C., ($\tau_1/\tau_2$) is from about 0.05 to about 0.45, preferably from about 0.08 to about 0.40, and most preferably from about 0.10 to about 0.35. In the case where ($\tau_1/\tau_2$) is less than about 0.05, the film tends to suffer from the undesirable wrinkles, non-uniform shrinkage and insufficient shrinkage and thus is not preferable. In the case where ($\tau_1/\tau_2$) is more than about 0.45, the film tends to suffer from insufficient shrinkage and thus is not preferable.

In the second embodiment, the sealing strength of the thermo-shrinkable polyester film is about 1.2 kg/15 mm of width or more, more preferably about 1.4 kg/15 mm of width or more, and most preferably about 1.6 kg/15 mm of width or more. In the case where the sealing strength is less than about 1.2 kg/15 mm of width, the value of the film is significantly lowered. When a film having such a low sealing strength covers a bottle and is shrunk after being made into a tube and cut by a heated blade (as described in more detail below in the Evaluation section), the portion which is heated and sealed on the bottle tends to rupture, and filament-like strands are generated and film pieces adhere to the heated cutting blade while being cut.

In the second embodiment, the thermal shrinkage ratio in the main shrinking direction of the polyester film in water is about 40% or more, preferably about 45% or more, after being treated at about 95° C. for about 10 seconds. The thermal shrinkage ratio in the direction perpendicular to the main shrinkage direction of the polyester film in water is from about 15 to about 30%, preferably form about 17 to about 25%, after being treated at about 95° C. for about 10 seconds.

Since the main shrinking direction is preferably the transverse direction in order to achieve the objectives of the present invention, an exemplary method for forming a film in the case where the main shrinking direction is the transverse direction will be described. The present invention is also applicable to a film, the main shrinking direction is the longitudinal direction.

A polyester dried by a dryer such as, for example, a hopper dryer, a paddle dryer or a vacuum dryer, which contains a polyester having a ΔT of about 40° C. or less preferably from about 10 to about 40 wt. % and more preferably from about 15 to about 30 wt. %, is extruded in the form of a film at about 200 to about 300° C. The extruded film is rapidly cooled to obtain an undrawn film. Typically, in order to produce a thermo-shrinkable polyester film of which main shrinking direction is the transverse direction, the undrawn film is drawn longitudinally at about 80 to about 95° C. at a drawing ratio of about 1.2× to about 1.8×, and then drawn transversely at about 80 to about 110° C. at a drawing ratio of about 3× to about 5×. These conditions can be varied appropriately.

Hereinafter, the present invention will be described in more detail by way of illustrative, but non-limiting examples.

<Evaluation>

First, the films are evaluated on the following points. (Evaluation used for the films in Embodiment 1)

(1) Thermal shrinkage ratio

A film is cut into square pieces of about 10 cm×10 cm. The square pieces are put in water of a prescribed temperature ±0.5° C. with no load for a prescribed period of time to be thermally shrunk. The resultant film pieces are measured in the longitudinal and transverse directions, and the thermal shrinkage ratio is obtained by expression (1). Among the longitudinal direction and the transverse direction, the direction having a greater thermal shrinkage ratio is set as a main shrinking direction.

$$\text{thermal shrinkage ratio} = ((\text{pre-shrinkage length} - \text{post-shrinkage length})/\text{pre-shrinkage length}) \times 100(\%) \quad (1)$$

(2) Post-shrinkage state

Five-hundred milliliter round bottles (height: 20.6 cm; diameter of central part: 6.5 cm; produced by Kabushiki Kaisha Yoshino Kogyosho; used for GOGO-NO KOCHA (product name; Kirin Beverage Company) provided with films therearound are passed through using a steam tunnel (SH-1500-L; Fuji Astec Inc.) with a passage time of 2.5 seconds and a temperature of about 80° C. The number of the samples used is 20.

Before the test, the films around the bottles are subject to three-color printing with green, gold and white ink (Toyo Ink Mfg. Co., Ltd.). The post-shrinkage state is visually evaluated by the following criteria.

○: No wrinkles are observed; the films are not shifted to a position above the prescribed position; no insufficient shrinkage is observed.

×: The films are shifted to a position above the prescribed position; or insufficient shrinkage is observed.

(3) Anti-rupture property

The films used in item (2) contains printing thereon are put around cans for canned coffee and put in water of about 75° C. for about 10 seconds to be shrunk by about 5%. The samples obtained are subjected to a tensile test using a tensile test apparatus (UTM-4L; Tokyo Seiki Co., Ltd.) in accordance with the method defined by JIS C2318.

The evaluation is conducted by the number of samples in which the elongation at rupture in the direction perpendicular to the main shrinking direction is about 20% or less. The number of samples used is 50. The values in Table 1 represent the ratio of the number of samples having such elongation at rupture with respect to the total number of sample of 50.

(4) Tg (glass transition point)

The temperature of approximately 10 mg of undrawn film is raised from about −40° C. to about 120° C. at a rate of about 20° C./min. using a differential scanning calorimeter (DSC220; Seiko Denshi Kogyo Kabushiki Kaisha) to obtain heat absorption curves. A tangent is drawn before and after the transition point of each heat absorption curve, and the intersection of the tangents is set as the glass transition point Tg.

(5) Ease of tearing along perforations

As shown in FIG. 1, the films are made into tubes (width: 106 mm; length: 54 mm) by the impulse seal method. Two parallel lines of perforations are formed in the length direction of each tube. The lines of perforations are 10 mm apart from each other. The films are put around PET bottles and shrunk by the method described in item (2) above. The number of samples are 50.

Figure 2:
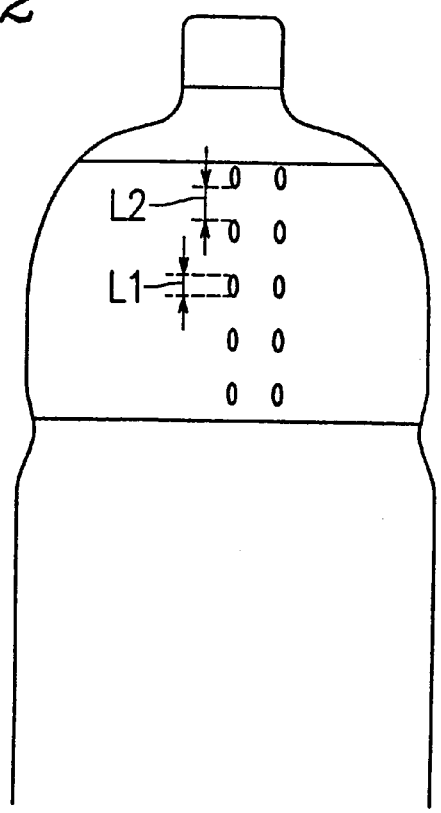
FIG. 2 is a side view of a tube-shaped thermo-shrinkable polyester film according to the present invention, which is provided around a bottle, having two parallel lines of perforations.

The films are torn along the perforations from the top (near the cap) toward the bottom of the bottles. The number of the samples in which the film is torn in an unintended direction is counted. The ratio of such samples against the total number of samples is set as the defective linear tearing ratio(%). In FIG. 2, L1 represents the length of each perforation, and L2 represents the distance between the perforations. In the example shown in FIG. 2, the ratio of L1 to L2 is about 2.5 to about 3.0.

(6) Thickness dispersion

The thickness of samples each having a longitudinal size of bout 5 cm and a transverse size of about 50 cm is measured using a contact thickness meter (KG60/A; Anritsu Corporation). The thickness dispersion is calculated for each sample by expression (2). Furthermore, the average of distribution is evaluated by the following criteria. The number of samples is 50.

$$\text{Thickness dispersion} = ((\text{maximum thickness} - \text{minimum thickness})/\text{average thickness}) \times 100(\%) \quad (2)$$

○: average value of about 6% or less

Δ: average value of more than about 6% but less than about 10%

×: average value of about 10% or more (7) Printability

The films are processed with three-color printing with green, gold and white with Ink Shrink EX (Toyo Ink Mfg. Co., Ltd.) in a superimposing manner, using a PAS-type multiple-color gravure printing apparatus (Kabushiki Kaisha Higashitani Tekkosho). The printing speed is about 100 m/min. and the drying temperature is about 50° C. The number of samples is 10.

The offsetting length among the colors is measured by JIS Class 1 measure and the printability is evaluated by the following criteria.

9

○: offsetting length of less than about 1 mm

Δ: offsetting length of about 1 mm or more but less than about 3 mm

×: offsetting length of about 3 mm or more (Evaluation used for the films in Embodiment 2)

(8) Stress of shrinkage

Samples having a size of about 10 cm in the direction in which the stress of shrinkage and a size of about 2 cm in the perpendicular direction are heated for about 1 minute in an air oven of about 90° C. using a tensile test apparatus (UTM-4L; Tokyo Seiki Co., Ltd.). The inter-chuck distance (i.e., the distance between two holders of the apparatus for putting a tension to the film) is about 50 mm. The force generated is recorded, and the maximum value is read. The stress of shrinkage of each sample is calculated by expression (3), and the average value of the samples is obtained as the stress of shrinkage.

Stress of shrinkage=(maximum value/pre-heat cross section of sample) (kg/mm$^2$)    (3)

(9) Sealing strength

Films are made into tubes, and the tubes are made into bags using an automatic bag producing apparatus (RP500; Kyoei Insatsu Kikai Zairyo) by cutting the tubes in a direction substantially perpendicular to the axial direction of the tube with a heated cutting blade having a temperature of at about 240° C. The blade angle is about 70 degrees. The rate of producing the bags under heating is about 100 bags/min. The resultant bags are sealed along two ends thereof by the heat of the cutting blade. From each bag, a piece including the sealed portion having a width of about 15 mm is cut out. The two sides of the open end of each piece are held by the chucks of a tensile test apparatus (STM-T-50BP; Toyo Baldwin) and pulled apart at a temperature of about 20° C., a humidity of about 65%, an inter-chuck distance of about 50 mm, and a tensile rate of about 200 mm/min. The strength of the force at which the sealed portion is peeled is defined as the sealing strength. In this example, the average of 10 samples is obtained.

(10) Thermal shrinkage ratio

A film is cut into square pieces of about 10 cm×10 cm. The square pieces are put in water of about 95±0.5° C. with no load for 10 seconds to be thermally shrunk. The resultant film pieces are measured in the longitudinal and transverse sizes, and the thermal shrinkage ratio is obtained by expression (4). Among the longitudinal direction and the transverse direction, the direction having a greater thermal shrinkage ratio is set as a main shrinking direction.

thermal shrinkage ratio=((pre-shrinkage length−post-shrinkage length)/pre-shrinkage length)×100(%)    (4)

(11) Melting point (Tm) and crystallizing temperature (Tc$_2$)

The temperature of approximately 10 mg of undrawn polyester film is raised from about 20° C. to about 300° C. at a rate of about 20° C./min. and kept for about 3 minutes at about 300° C., using a differential scanning calorimeter (DSC220; Seiko Denshi Kogyo Kabushiki Kaisha), thereby obtaining fused polyester. The resultant fused polyester is cooled to a temperature of about 100° C. at a rate of about 20° C./min. to obtain heat absorption and generation curves. The temperature having the peak of each heat absorption curve during the temperature rise is obtained as the melting point, and the temperature having the peak of each heat generation curve during the temperature fall is obtained as the crystallizing temperature.

(12) Post-shrinkage state

The films are passed through a universal shrinker (K2000; Kyowa Denki) in the state of being provided around commercially available laminate tube (REVITAL (product name of rinse; Shiseido Co., Ltd.) for about 15 seconds at temperature heating zone 1 of about 160° C. and temperature heating zone 2 of about 180° C. The number of samples is 10.

The evaluation is conducted by the following criteria.

○: No defects is observed.

×: Wrinkles and insufficient shrinkage are observed.

The following examples are performed using the following polyesters. "IV" refers to intrinsic viscosity.

Polyester A: polyethylene terephthalate (IV: 0.75) Polyester B: ethylene glycol (70 mol %), neopentyl glycol (30 mol %) and terephthalic acid (100 mol %) (IV: 0.72) Polyester C: polybuthylene terephthalate (IV: 1.20) Polyester D: terephthalic acid (65 mol %), adipic acid (10 mol %), isophthalic acid (25 mol %), and butanediol (100 mol %) (IV: 0.72)

EXAMPLES OF EMBODIMENT 1

Example 1

A polyester was obtained by mixing about 25 wt. % of polyester A, about 55 wt. % of polyester B, and about 20 wt. % of polyester C, and then the mixture was extruded at about 280° C. and rapidly cooled, thereby obtaining an undrawn film. The glass transition point of the undrawn film was about 66° C.

The undrawn film was preheated up to about 85° C. under the conditions of a heat transfer coefficient of about 0.0008 cal/cm$^2$·sec·° C. and then drawn in the transverse direction at about 74° C. at a ratio of about 4× by a tenter. Then, the film was heated at about 80° C. for about 10 seconds. Thus, a thermo-shrinkable polyester film having a thickness of about 50 μm was obtained.

Example 2

A polyester was obtained by mixing about 25 wt. % of polyester A, about 50 wt. % of polyester B, and about 25 wt. % of polyester C, and then the mixture was extruded at about 280° C. and rapidly cooled, thereby obtaining an undrawn film. The glass transition point of the undrawn film was about 63° C.

The undrawn film was preheated up to about 82° C. under the conditions of a heat transfer coefficient of about 0.0008 cal/cm$^2$·sec·° C. and then drawn in the transverse direction at about 72° C. at a ratio of about 4× by a tenter. Then, the film was heated at about 79° C. for about 10 seconds. Thus, a thermo-shrinkable polyester film having a thickness of about 50 μm was obtained.

Example 3

A polyester was obtained by mixing about 25 wt. % of polyester A, about 45 wt. % of polyester B, and about 30 wt. % of polyester C, and then the mixture was extruded at about 280° C. and rapidly cooled, thereby obtaining an undrawn film. The glass transition point of the undrawn film was about 61° C.

The undrawn film was preheated up to about 80° C. under the conditions of a heat transfer coefficient of about 0.0008 cal/cm$^2$·sec·° C. and then drawn in the transverse direction at about 69° C. at a ratio of about 4× by a tenter. Then, the film was heated at about 77° C. for about 10 seconds. Thus, a thermo-shrinkable polyester film having a thickness of about 50 μm was obtained.

Example 4

A polyester was obtained by mixing about 40 wt. % of polyester A, about 50 wt. % of polyester B, and about 10 wt. % of polyester D, and then the mixture was extruded from a T die at about 280° C. and rapidly cooled by a chill roll, thereby obtaining an undrawn film. The glass transition point of the undrawn film was about 67° C.

The undrawn film was drawn in the same manner as described in Example 1. Thus, a thermo-shrinkable polyester film having a thickness of about 50 μm was obtained.

Comparative example 1

A thermo-shrinkable polyester film having a thickness of about 50 μm was obtained in the same manner as described in Example 1 except that the drawing temperature was about 83° C.

Comparative example 2

A thermo-shrinkable polyester film having a thickness of about 50 μm was obtained in the same manner as described in Example 1 except that the drawing temperature was about 60° C. The films were entirely blushed at the exit of the tenter.

Comparative example 3

A polyester was obtained by mixing about 25 wt. % of polyester A, about 65 wt. % of polyester B, and about 10 wt. % of polyester C, and then the mixture was extruded from a T die at about 280° C. and rapidly cooled, thereby obtaining an undrawn film. The glass transition point of the undrawn film was about 69° C.

The undrawn film was preheated up to about 90° C. under the conditions of a heat transfer coefficient of about 0.0008 cal/cm$^2$·sec·° C. and then drawn in the transverse direction at about 75° C. at a ratio of about 4× by a tenter. Then, the film was heated at about 80° C. for about 10 seconds. Thus, a thermo-shrinkable polyester film having a thickness of about 50 μm was obtained.

Comparative example 4

A thermo-shrinkable polyester film having a thickness of about 50 μm was obtained in the same manner as described in Example 1 except that the post-drawing heating temperature was about 75° C.

Comparative example 5

A thermo-shrinkable polyester film having a thickness of about 50 μm was obtained in the same manner as described in Example 1 except that the post-drawing heating temperature was about 83° C.

Comparative example 6

A thermo-shrinkable polyester film having a thickness of about 50 μm was obtained in the same manner as described in Example 1 except that the heat transfer coefficient was about 0.0017 cal/cm$^2$·sec·° C.

Table 1 shows the evaluation results of the films obtained in Examples 1 through 4 and Comparative examples 1 through 6. As seen from Table 1, the films obtained in Examples 1 through 4 exhibit satisfactory values in all the evaluation items including the pre-shrinkage state, ease of tearing along perforations, and thickness dispersion. As can be appreciated, the thermo-shrinkable polyester film in the first embodiment of the present invention is of satisfactory quality, highly practical and especially suitable for use as films for labels.

In contrast, the thermo-shrinkable polyester film in Comparative example 1 is inferior in ease of tearing along perforations due to the inferior anti-rupture property. The thermo-shrinkable polyester film in each of Comparative examples 3 and 5 suffer from wrinkles and insufficient shrinkage, resulting in an inferior post-shrinkage state. The thermo-shrinkable polyester film in Comparative example 4 shifts to a position different from a prescribed position when put around the bottle, resulting in an inferior post-shrinkage state. The thermo-shrinkable polyester film in Comparative example 6 is inferior in the thickness dispersion. As can be appreciated, the thermo-shrinkable polyester films in the Comparative examples 1 through 6 are of low quality and are not practical for use as label films.

TABLE 1

|  | Thermal shrinkage ratio in main direction (%) | | | Anti-rupture property | Post-shrinkage state | Ease of tearing along perforations (defective linear tearing ratio) | Thickness dispersion | Printability |
| --- | --- | --- | --- | --- | --- | --- | --- | --- |
|  | 70° C. | 75° C. | 80° C. |  |  |  |  |  |
| Example 1 | 22 | 44 | 57 | 0/50 | ○ | 0/50 | ○ | ○ |
| Example 2 | 24 | 46 | 55 | 0/50 | ○ | 0/50 | ○ | ○ |
| Example 3 | 25 | 45 | 54 | 0/50 | ○ | 1/50 | ○ | ○ |
| Example 4 | 23 | 44 | 54 | 0/50 | ○ | 1/50 | ○ | ○ |
| Comparative example 1 | 20 | 42 | 54 | 33/50 | ○ | 48/50 | Δ | Δ |
| Comparative example 2* | — | — | — | — | — | — | — | — |
| Comparative example 3 | 3 | 27 | 47 | 0/50 | X Wrinkles, insufficient shrinkage | 0/50 | ○ | ○ |
| Comparative example 4 | 29 | 52 | 65 | 0/50 | X Shifting | 0/50 | ○ | ○ |
| Comparative example 5 | 8 | 32 | 47 | 1/50 | X Insufficient Shrinkage | 2/50 | ○ | ○ |
| Comparative example 6 | 21 | 42 | 53 | 12/50 | ○ | 30/50 | X | X |

*Untestable

EXAMPLES OF EMBODIMENT 2

The following examples are performed using the polyesters shown in Table 2.

TABLE 2

| Polyester | Composition | Tm (°C.) | Tc$_2$ (°C.) |
|---|---|---|---|
| E | Polyethylene terephthalate | 255 | 195 |
| F | Ethylene glycol (70 mol %), neopentyl glycol (30 mol %) and terephthalic acid (100 mol %) | —* | —* |
| G | Polybuthylene terephthalate | 225 | 195 |
| H | Terephthalic acid (90 mol %), dimer acid (10 mol %) and butanediol (100 mol %) | 200 | 167 |
| I | Terephthalic acid (90 mol %), dimer acid (10 mol %) and ethylene glycol (100 mol %) | 230 | 179 |
| J | Terephtalic acid (65 mol %), isophthalic acid (10 mol %), adipic acid (25 mol %) and butanediol (100 mol %) | 165 | 135 |

*Peaks for the melting point or crystallization temperature are not exhibited since crystallization does not occur during temperature rise and fall.

Example 5

A polyester was obtained by mixing about 10 wt. % of polyester E, about 65 wt. % of polyester F, and about 25 wt. % of polyester G, and then the mixture was extruded from a T die at about 280° C. and rapidly cooled by a chill roll, thereby obtaining an undrawn film. The undrawn film was drawn in the longitudinal direction at a ratio of about 1.4× by a multiple continuous rolling-type vertical drawing apparatus (temperature of the rolls: about 85° C.). After the film was preheated up to about 95° C., the film was drawn in the transverse direction at about 80° C. at a ratio of about 4× by a tenter. The resultant film was heated at about 90° C. for about 8 seconds by the tenter. Thus, a thermo-shrinkable polyester film having a thickness of about 25 μm was obtained.

Example 6

A thermo-shrinkable polyester film having a thickness of about 25 μm was obtained in the same manner as in Example 5 except that a polyester was obtained by mixing about 10 wt. % of polyester E, about 65 wt. % of polyester F, and about 25 wt. % of polyester H was used.

Example 7

A thermo-shrinkable polyester film having a thickness of about 25 μm was obtained in the same manner as in Example 5 except that a polyester was obtained by mixing about 10 wt. % of polyester E, about 65 wt. % of polyester F, and about 25 wt. % of polyester J was used.

Comparative example 7

The undrawn film obtained with the polyester described in Example 5 was preheated up to about 95° C. and then drawn in the transverse direction at about 80° C. at a ratio of about 4×. The resultant film was heated at about 90° C. for about 8 seconds. Thus, a thermo-shrinkable polyester film having a thickness of about 25 μm was obtained.

Comparative example 8

A thermo-shrinkable polyester film having a thickness of about 25 μm was obtained in the same manner as in Example 5 except that a polyester was obtained by mixing about 35 wt. % of polyester E and about 65 wt. % of polyester F was used.

Comparative example 9

A thermo-shrinkable polyester film having a thickness of about 25 μm was obtained in the same manner as in Example 5 except that a polyester was obtained by mixing about 10 wt. % of polyester E, about 65 wt. % of polyester F, and about 25 wt. % of polyester I was used.

Table 3 shows the evaluation results of the films obtained in Examples 5 through 7 and Comparative examples 7 through 9. As seen from Table 3, the films obtained in Examples 5 through 7 exhibit satisfactory values in all the evaluation items including the pre-shrinkage state, and sealing strength. Furthermore, the heated seal portions of the films obtained in Examples 5 through 7 exhibit satisfactory shape (i.e., no filament-like strands are generated). As can be appreciated, the thermo-shrinkable polyester film in the second embodiment of the present invention is of satisfactory quality, highly practical and suitable especially for covering complex-shaped containers after being made into a tube and cut by a heated blade as described in detail above in the Evaluation section.

In contrast, the thermo-shrinkable polyester film in Comparative example 7 suffers from wrinkles and insufficient shrinkage. The thermo-shrinkable polyester film in Comparative example 8 suffers from wrinkles and has a low sealing strength and thus a low seal-processability. In this specification, the expression "low seal-processability" refers to, for example, a sealed portion obtained in the manner described in the Evaluation section which generates filament-like strands or is wavy (i.e., non-uniform) along a plane which is substantially perpendicular to the axial direction of the tube. The thermo-shrinkable polyester film in Comparative example 9 has a low sealing strength and thus a low seal-processability. As can be appreciated, the thermo-shrinkable polyester films in the Comparative examples 7 through 9 are of low quality and are not practical for use as covering films.

TABLE 3

| | Thermal shrinkage ratio(95°C., 10 sec.) (longitudinal/transverse) (%) | Stress of shrinkage (kg/mm$^2$) | | | Sealing strength (kg/15 mm of width) | Post-shrinkage state |
|---|---|---|---|---|---|---|
| | | τ$_1$ | τ$_2$ | τ$_1$/τ$_2$ | | |
| Example 5 | 18/55 | 0.05 | 0.38 | 0.13 | 2.1 | ○ |
| Example 6 | 22/58 | 0.08 | 0.42 | 0.19 | 1.9 | ○ |
| Example 7 | 20/50 | 0.04 | 0.30 | 0.23 | 1.8 | ○ |
| Comparative example 7 | 2/55 | 0.01 | 0.40 | 0.03 | 2.1 | X*1 |
| Comparative example 8 | 10/58 | 0.02 | 0.95 | 0.02 | 0.7 | X*2 |
| Comparative example 9 | 16/55 | 0.03 | 0.35 | 0.09 | 1.0 | ○ |

*1: Wrinkles, insufficient shrinkage
*2: Wrinkles

As described above, a thermo-shrinkable polyester film according to the present invention exhibits a satisfactory post-shrinkage state with substantially uniform shrinkage and no wrinkles or distortions in all possible uses including labels for bottles, and is easily torn along perforations formed therein. Furthermore, a thermo-shrinkable polyester film according to the present invention exhibits a satisfactory post-shrinkage state with substantially uniform shrinkage and no wrinkles or distortions even when shrunk in the state of covering a container having a complicated shape such as, for example, cosmetic containers, fragrance and toiletry containers, or liquid medication containers, and has a superior sealing strength.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A thermo-shrinkable polyester film, wherein:
   the thermal shrinkage ratio in a main shrinking direction is about 20% or more after being treated in water of about 70° C. for about 5 seconds, about 35 to about 55% after treated in water of about 75° C. for about 5 seconds, and about 50 to about 60% after being treated in water of about 80° C. for about 5 seconds, and
   after the film is shrunk by about 5% by treatment in water of about 75° C. for about 10 seconds, the probability of the elongation at rupture of the film in the direction perpendicular to the main shrinking direction being about 20% or less, is about 10% or less.

2. A thermo-shrinkable polyester film according to claim 1, having a thickness of dispersion of about 6% or less.

3. A thermo-shrinkable polyester film according to claim 1, comprising a polyester including at least one diol having from about 3 to about 6 carbon atoms, the polyester being adjusted to have a glass transition point of about 58 to about 68° C.

4. A thermo-shrinkable polyester film, wherein:
   the ratio of $\tau_1/\tau_2$ is about 0.05 to about 0.45, where $\tau_2$ is the stress of shrinkage in a main shrinking direction of the film at about 90° C., and $\tau_1$ is the stress of shrinkage in a direction perpendicular to the main shrinking direction of the film at about 90° C., and
   the sealing strength of the film is about 1.2 kg/15 mm of width or more.

5. A thermo-shrinkable polyester film according to claim 4, wherein the thermal shrinkage ratio in the main shrinking direction after being treated in water of about 95° C. for about 10 seconds is about 40% or more, and the thermal shrinkage ratio in the direction perpendicular to the main shrinking direction after being treated in water of about 95° C. for about 10 seconds is about 15 to about 30%.

6. A thermo-shrinkable polyester film according to claim 4, comprising a polyester, of which the difference ($\Delta T$) between a melting point (Tm) and a crystallization temperature ($Tc_2$) when a fused polyester is cooled is about 40° C. or less, is contained in an amount from about 10 to 40 wt. % in the thermo-shrinkable polyester film.

* * * * *